US008924921B2

(12) United States Patent
Rush et al.

(10) Patent No.: US 8,924,921 B2
(45) Date of Patent: Dec. 30, 2014

(54) ABSTRACTING BUSINESS LOGIC INTO CENTRALIZED DATABASE CONTROLS

(75) Inventors: Jon Rush, Rochester, MN (US); Richard Donald Salz, Rochester, MN (US); Michael John Sandberg, Byron, MN (US); Kay Anderson Tate, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 12/426,722

(22) Filed: Apr. 20, 2009

(65) Prior Publication Data

US 2010/0269088 A1   Oct. 21, 2010

(51) Int. Cl.
*G06F 9/44* (2006.01)
*G06F 17/30* (2006.01)

(52) U.S. Cl.
CPC .... *G06F 17/30557* (2013.01); *G06F 17/30371* (2013.01)
USPC .............. 717/104; 717/106; 703/22

(58) Field of Classification Search
CPC ........... G05B 19/056; G06F 8/30; G06F 8/65; G06F 8/66; G06F 9/4425; G06F 9/44573; G06F 11/0751; G06F 17/5022; G06F 21/563; G06F 3/01; G06F 8/443
USPC .......... 717/104, 106; 703/1–22; 707/790–812
See application file for complete search history.

(56) References Cited

U.S. PATENT DOCUMENTS

| | | | | |
|---|---|---|---|---|
| 5,386,557 A * | 1/1995 | Boykin et al. | ......................... | 1/1 |
| 7,246,307 B2 * | 7/2007 | Arora et al. | ................... | 715/208 |
| 7,454,706 B1 * | 11/2008 | Matthews et al. | ............. | 715/713 |
| 7,624,449 B1 * | 11/2009 | Perriot | ............................. | 726/24 |
| 7,793,219 B1 * | 9/2010 | Stratton et al. | ................. | 715/723 |
| 8,161,389 B1 * | 4/2012 | Penner et al. | .................. | 715/731 |
| 2002/0038450 A1 * | 3/2002 | Kloppmann et al. | ......... | 717/102 |
| 2002/0111824 A1 * | 8/2002 | Grainger | .......................... | 705/1 |
| 2002/0116419 A1 * | 8/2002 | Iyer et al. | ...................... | 707/517 |
| 2003/0058277 A1 * | 3/2003 | Bowman-Amuah | .......... | 345/765 |
| 2003/0191864 A1 * | 10/2003 | Govindarajapuram et al. | ............................ | 709/310 |
| 2004/0158820 A1 * | 8/2004 | Moore et al. | .................. | 717/136 |
| 2004/0205118 A1 * | 10/2004 | Yu | ................................. | 709/203 |

(Continued)

OTHER PUBLICATIONS

Chanana, V.; Koronios, A.; "Data Quality Through Business Rules"; ICICT '07 International Conference, Information and Communication Technology; Mar. 7-9, 2007; pp. 262-265.

(Continued)

*Primary Examiner* — Chat Do
*Assistant Examiner* — Sergio J Curbelo, III
(74) *Attorney, Agent, or Firm* — D'Ambrosio & Menon, PLLC; Usha Menon

(57) ABSTRACT

Methods, systems, and products for abstracting business logic into centralized database controls are disclosed herein. In one general embodiment, a method, executed by a computer system, includes identifying data use code in business logic: analyzing the data use code to determine a general data model: and implementing the general data model in the centralized database controls. The general data model is an abstraction embodying the functionality inherent in the data use code. In specific embodiments, identifying data use code in the business logic may be carried out by identifying the data use code in at least one subcomponent of the business logic, such as a user interface code component, a database coding, a table, or a file. The computer system may remove the data use code from the business logic or designate the data use code for removal.

9 Claims, 12 Drawing Sheets

(56) References Cited

U.S. PATENT DOCUMENTS

| | | | |
|---|---|---|---|
| 2004/0210445 | A1 | 10/2004 | Veronese et al. |
| 2004/0221282 | A1* | 11/2004 | Le Metayer et al. ........... 717/159 |
| 2005/0085928 | A1* | 4/2005 | Shani ............................. 700/18 |
| 2006/0224613 | A1 | 10/2006 | Bermender et al. |
| 2007/0043832 | A1* | 2/2007 | Sane ............................. 709/219 |
| 2007/0118793 | A1* | 5/2007 | Arora et al. ................. 715/501.1 |
| 2007/0204169 | A1 | 8/2007 | Bahl et al. |
| 2007/0214100 | A1 | 9/2007 | Marfatia et al. |
| 2007/0256058 | A1 | 11/2007 | Marfatia et al. |
| 2008/0104092 | A1 | 5/2008 | Cummins |
| 2008/0126291 | A1 | 5/2008 | Lyle |

OTHER PUBLICATIONS

Sneed, H.M.; "Extracting Business Logic from Existing COBOL Programs as a Basis for Redevelopment" IWPC 2001 Proceedings; 9th International Workshop; May 12-13, 2001; pp. 167-170.

Ali, S.; Soh, B.; Lai, J.; "Rule Extraction Methodology by Using XML for Business Rules Documentation"; Industrial Informatics; 3rd IEEE International Conference; Aug. 10-12, 2005; pp. 357-361.

Auechaikul, T.; Vatanawood, W.; "A Development of Business Rules with Decision Tables for Business Processes;" TENCON 2007, IEEE Region 10 Conference; Oct. 30-Nov. 2, 2007; pp. 1-4.

Rosenberg, F.; Nagl, C., Dustdar, S.; "Applying Distributed Business Rules—The VIDRE Approach;" Services Computing, SCC' 06, IEEE International Conference; Sep. 2006; pp. 471-478.

Fu, G.; Shao, J.; Embury, S.M.; Gray, W.A.; Liu, X.; "A Framework for Business Rule Presentation;" Database and Expert Systems Applications, Proceedings, 12th International Workshop; Sep. 3-7, 2001; pp. 922-929.

Ziad, Kobti; Sundaravadanam, Menaka; "An Enhanced Conceptual Framework to Better Handle Business Rules in Process Oriented Applications;" ICWE '06: Proceedings of the 6th International Conference on Web Engineering; Jul. 2006; ACM.

* cited by examiner

```
************************ Beginning of data ************************************************
                                          UNIQUE
0001.00
0002.00   R ORDERS                                                       970518
0003.00     ORDER_NO    9B 0        ALIAS(ORDER_NUMBER)                  970518
0004.00                             COLHDG('ORDER_NUMBER')               051129
0005.00                             ALWNULL                              970522
0006.00     AGENT_NO    9B 0        ALWNULL                              970522
0007.00                             COLHDG('AGENT_NO')                   970522
0008.00     CUST_NO     9B 0        ALIAS(CUSTOMER_NUMBER)               051129
0009.00                             COLHDG('CUSTOMER_NUMBER')            970522
0010.00                             ALWNULL                              970518
0011.00     FLIGHT_NO   9B 0        ALIAS(FLIGHT_NUMBER)                 051129
0012.00                             COLHDG('FLIGHT_NUMBER')              970522
0013.00                             ALWNULL                              970522
0014.00     DEPAR_DATE    Z         ALIAS(DEPARTURE_DATE)                051129
0015.00                             COLHDG('DEPARTURE_DATE')             970522
0016.00                             ALWNULL                              970518
0017.00     TICKS_ORD   9B 0        ALIAS(TICKETS_ORDERED)               051129
0018.00                             COLHDG('TICKETS_ORDERED')            970522
0019.00                             ALWNULL                              970518
```

FIG. 4A

```
************ Beginning of data ************************************************
0001.00     FFRS002DFCF   E                              WORKSTN    KINFDS WSDS
0002.00     FFRCITY    IF   E           K        DISK                           970807
0003.00     FTOCITY    IF   E           K        DISK                           970801
0004.00     FCUSTOMERIF   F   70  04AI            1 DISK                        970801
0005.00     FCUSTNAMEIF   F   70  66AI            5 DISK                    A   970802
0006.00     FORDNAME  IF   F  138  09AI            1 DISK                       970802
0007.00     FORDERSZ  UF   F   72  09AI            1 DISK                       970807
0008.00     FFLIGHTSZ IF   F  233  09AI            1 DISK                       970807
0009.00     *                                                                   970802
0010.00     ICUSTOMERNS   01                                                    970802
0011.00     I                                          B   1  40CNUMBR          970802
0012.00     *                                                                   970801
0013.00     ICUSTNAMENS   02                                                    970802
0014.00     I                                          B   1  40CNNMBR          970807
0015.00     *                                                                   970805
0016.00     IORDNAME  NS  03                                                    970807
0017.00     I                                              1     90ORDRNO       970807
0018.00     I                                          B  10    130AGNTNO       970807
0019.00     I                                          B  14    170CUSTNO       970807
```

FIG. 4B

| | | | | |
|---|---|---|---|---|
| 0260.00 | C | MOVE *BLANKS | MSGDTA 80 | | 970801 |
| 0261.00 | C | MOVE @PGM | MSGQUE 10 | | 970801 |
| 0262.00 | C* | | | | 951209 |
| 0263.00 | C | MOVE @FALSE | @EXIT 1 | | 951209 |
| 0264.00 | C | MOVE @PGM | PGMQ | | 951209 |
| 0265.00 | C* | | | | 970801 |
| 0266.00 | C | Z-ADDPORDER | ORDNUM | | 970807 |
| 0267.00 | C* | | | ACTIVE | 970807 |
| 0268.00 | C ORDNUM | CHAINORDNAME | 44 | | 970807 |
| 0269.00 | C* | | | | 970807 |
| 0270.00 | C | MOVE DEPART | FILDPK | | 970807 |
| 0271.00 | C | MOVE FILYY | DOFYR | | 970807 |
| 0272.00 | C | MOVE FILMM | DOFMON | | 970807 |
| 0273.00 | C | MOVEFILDD | DOFDAY | | 970807 |
| 0274.00 | C* | | | | 970807 |
| 0275.00 | C | MOVE CNAME | CUSTKY | | 970807 |
| 0276.00 | C | MOVELCUSTNM | CUSNAM | | 970807 |
| 0277.00 | C* | | | | 970807 |
| 0278.00 | C | MOVE CLASS | CLASSK | | 970807 |
| 0279.00 | C* | | | | 970807 |

FIG. 4C

```
(Global Scope)
  float Count2rad(float);
  float calcX(float, float);
  float calcY(float, float);

/*Start of main function*/
int robotmain(void)
{
    /*Declarations*/
    float rad1, rad2, posX, posY, count1, count2;
    int i, numCounts = 0;

FILE *input;
    FILE *results;

/* Print title of program */
    printf("            2DOF ROBOT POSITION CALCULATOR\n");
    printf("- - - - - - - - - - - - - - - - - - - - - - - - - - - - - - - - -\n\n");
    printf(" \tLINK LENGTH 1[m]: 0.450/n");
    printf(" \tLINK LENGTH 2[m]: 0.350/n/n");

/* Open the data file */
    input = fopen(FILENAME, "r");

/*Make sure file opened alright*/
    if(input==NULL)
    {
        printf("Error: cannot open file.\n");
        return 1;
    }

/* Get number of encoder counts */
    fscanf(input,"%d", &numCounts);

/* Read out x and y position */
    printf("            CONVERTING %d RECORDS\n", numCounts);
```

FIG. 8A

```
    printf("        CONVERTING %d RECORDS\n", numCounts);
    printf("    x pos[m]           y pos[m]\n");

/* Open the output file */
    results = fopen(FILELOAD, "w");

fprintf(results, " 2DOF ROBOT POSITION CALCULATOR\n");
    fprintf(results, " LINK LENGTH 1 [M]: 0.450\n");
    fprintf(results, " LINK LENGTH 2 [M]: 0.350\n\n");
    fprintf(results, " %d RECORDS\n", numCounts);
    fprintf(results, "x pos [m]          y pos[m]\n");

for(i=1; i<=numCounts; i++
    {
        fscanf(input, "%f%f", &count1, &count2);
        rad1 = Count2rad (count1);
        rad2 = Count2rad (count2);

posX = calcX (rad1, rad2);
        posY = calcY (rad1, rad2);
        fprintf(results, " %.3f          %.3f\n", posX, posY);
        /* Print results to screen */
        fprintf("        %.3f          %.3f\n", posX, posY);

}

/*Close the files*/
    fclose (input);
    fclose (results);

/*end the program*/
    return 0;
}

/* Functions */
```

FIG. 8B

ABSTRACTING BUSINESS LOGIC INTO CENTRALIZED DATABASE CONTROLS

BACKGROUND

Present-day computer systems often use architectures which isolate business logic from user interface considerations and data use, such as the Model-View-Controller ('MVC') architecture or the three-tier model. One of the many advantages of such architectures is that any component can be changed without affecting the other. Any of the three tiers may be upgraded or replaced independently as requirements or technology change. Typically, a Database Management System ('DBMS') on a database server or mainframe contains the computer data storage logic. Isolating data use keeps data neutral and allows leveraging of the data by business logic outside of the original application.

Current enterprise resource planning ('ERP') is an enterprise-wide information system designed to coordinate all the information and activities needed to complete business processes. An ERP system is based on a common database and a modular software design. The common database can allow every department of a business to store and retrieve information.

SUMMARY

Embodiments of the present invention relate to abstracting business logic into centralized database controls. Many legacy software applications, or software applications written using legacy methodology, do not isolate code for data use from the business logic entity. Thus, the data use code is embedded in the general application code, such as, for example, business logic code, user interface code, databases, and files. This embedded data use code becomes problematic when the database use is expanded to new applications, requiring the data use functionality to be recreated by copying the data use code into the new application. It is much more reliable and cost effective to leverage this functionality by directly accessing the data use logic along with the data in the database, instead of recoding external business logic.

Methods, systems, and products for abstracting business logic into centralized database controls are disclosed herein. In one general embodiment, a method, executed by a computer system, includes identifying data use code in business logic (as embodied in a software entity); analyzing the data use code to determine a general data model; and implementing the general data model in the centralized database controls. The general data model is an abstraction embodying the functionality inherent in the data use code. In specific embodiments, identifying data use code in the business logic may be carried out by identifying the data use code in at least one subcomponent of the business logic, such as a user interface code component, a database coding, a table, or a file. The computer system may remove the data use code from the business logic or designate the data use code for removal.

Analyzing the data use code may include consolidating instances of the data use code into the general data model. Constraint checking code may be ported to the centralized database controls by creating database triggers, while data use code implementing a business rule may be converted to stored procedures. Data model information may be integrated into the general data model of the centralized database controls.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIGS. 4A-C are diagrams illustrating the source code of exemplary business logic written in the RPG programming language with embedded data use code which may be abstracted by embodiments of the invention.

FIGS. 8A and 8B are diagrams illustrating the source code of exemplary business logic with embedded data use code which may be abstracted by embodiments of the invention.

DETAILED DESCRIPTION

Exemplary methods, systems, and design structures for abstracting business logic into centralized database controls are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and their practical application, and to enable others of ordinary skill in the art to understand the invention for various embodiments with various modifications as are suited to the particular use contemplated.

Figure 1A:
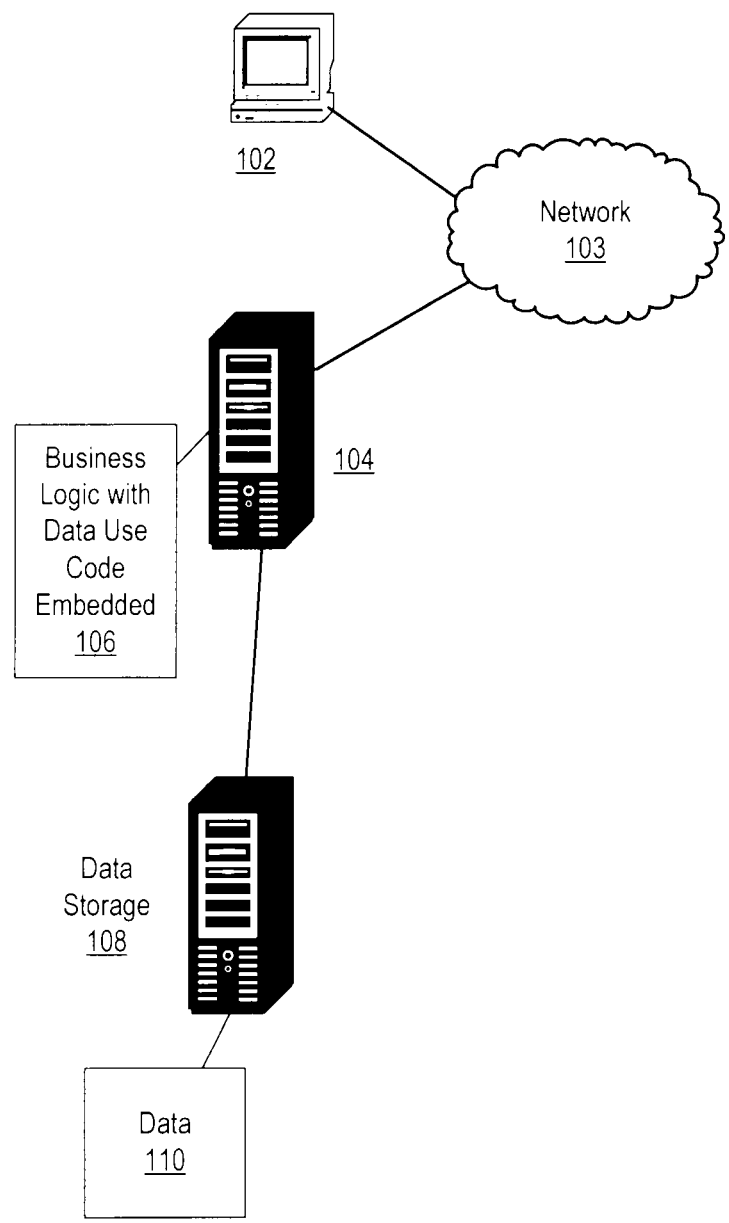
FIG. 1A illustrates an exemplary system for running applications written for a legacy architecture.

FIG. 1A illustrates an exemplary system for running applications written for a legacy architecture. The system includes a computing device 102 connected by network 103 to a server computer 104, which is connected locally to data storage 108. Computing device 102 could be a desktop computer, a server, a smart phone, a personal digital assistant ('PDA'), a laptop computer, or any other computing device capable of being used by an operator to interact with server computer 104. Server computer 104 contains business logic (including business logic code, user interface code, databases, and files) with data use code embedded 106. Data 110 is stored in data storage 108. Networks 103 and 105 may include, alone or in combination, one or more local area networks ('LANs'), wide area networks ('WANs'), wired or cellular telephone networks, intranets, or the Internet. In some implementations, network 103 and network 105 may be the same network.

Because the data use code is embedded in the general application code, when the database use is expanded to new applications the data use code must be ported to the new system. Current MVC and ERP architectures utilize several instances of business logic leveraging the same database. Instead of recreating the functionality by copying the data use code into the new application, it is much more reliable and cost effective to directly access the data use logic along with the data in the database. Although reference is made to "legacy code" or "legacy methods" herein, the software entity embodying the business logic may have been recently developed. Embodiments of the invention facilitate conversion to an architecture where data use logic is isolated in centralized database controls.

Figure 1B:
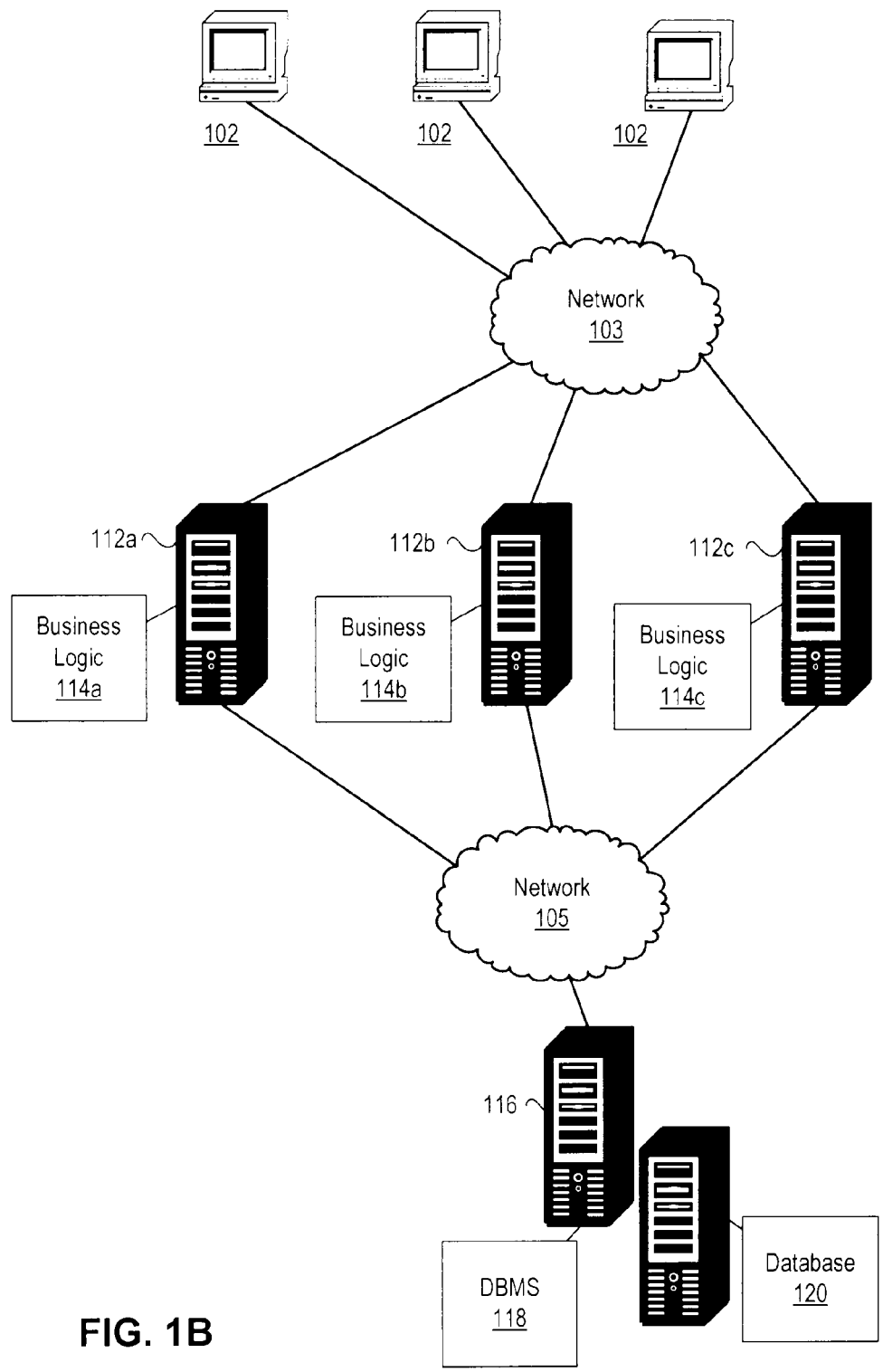
FIG. 1B illustrates an exemplary system for running applications having data use logic isolated in centralized database controls.

FIG. 1B illustrates an exemplary system for running applications having data use logic isolated in centralized database controls. Computing devices 102 are connected to application servers 112a, 112b, and 112c by network 103. Application servers 112a, 112b, and 112c are connected to database server 116 by network 105. Application servers 112a, 112b, and 112c each run different business logic applications 114a, 114b, 114c and access data in database 120 using DBMS 118. DBMS 118 incorporates data use code, so that business logic applications 114a, 114b, 114c need not include the same data use logic recoded into each business logic application.

Embodiments of the present disclosure generally include methods, systems, and products for abstracting business logic for inclusion into centralized database controls. In one general embodiment, a computer system executing computer program instructions automates the task of searching a business logic software entity for data use in business logic code, user interface code and the data repository, and then programmatically analyzes the data use logic embedded in the business logic to determine a functionality, such as, for example, constraint checking. The business logic software entity may be any software entity primarily written to implement business logic or containing business logic code as a majority of code, such as, for example, applications suites, applications, methods, procedures, and so on. Then the functionality is added to the centralized database controls for the system. Data and its access will remain consistent. Embodiments of the present invention may result in increased integrity or robustness for the data. The streamlined business logic may also run faster, avoid errors, or be easier to maintain.

Figure 2:
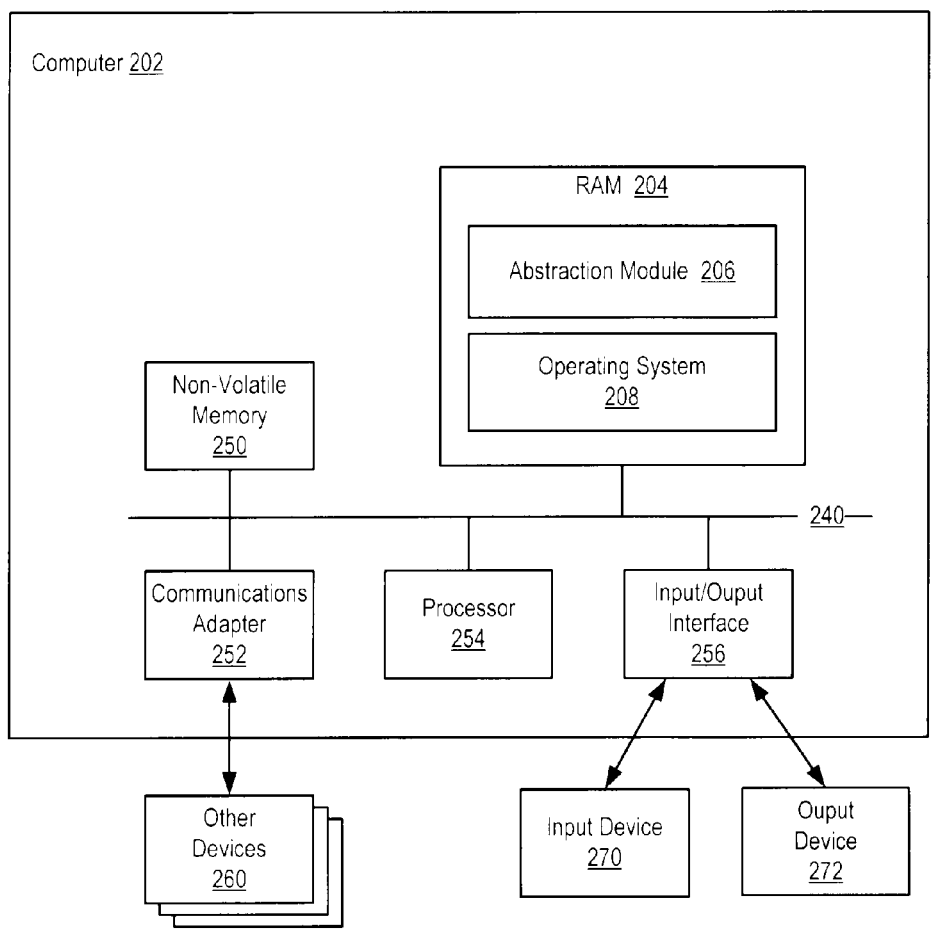
FIG. 2 sets forth a block diagram of an exemplary computer in accordance with one embodiment of the invention.

Embodiments of the presently disclosed invention are implemented to some extent as software modules installed and running on one or more data processing systems ('computers'), such as servers, workstations, tablet computers, PCs, personal digital assistants ('PDAs'), smart phones, and so on. FIG. 2 sets forth a block diagram of an exemplary computer 202. Computing device 202 includes at least one computer processor 254 as well as a computer memory, including both volatile random access memory ('RAM') 204 and some form or forms of non-volatile computer memory 250 such as a hard disk drive, an optical disk drive, or an electrically erasable programmable read-only memory space (also known as 'EEPROM' or 'Flash' memory). The computer memory is connected through a system bus 240 to the processor 254 and to other system components. Thus, the software modules are program instructions stored in computer memory.

An operating system 208 is stored in computer memory. Operating system 208 may be any appropriate operating system such as Windows XP, Windows Vista, Mac OS X, UNIX, LINUX, or AIX from International Business Machines Corporation (Armonk, N.Y.).

Computing device 202 also includes one or more input/output interface adapters 256. Input/output interface adapters 256 may implement user-oriented input/output through software drivers and computer hardware for controlling output to output devices 272 such as computer display screens, as well as user input from input devices 270, such as keyboards and mice.

Computing device 202 also includes a communications adapter 252 for implementing data communications with other devices 260. Communications adapter 252 implements the hardware level of data communications through which one computer sends data communications to another computer through a network.

Also stored in computer memory is an abstraction determination module 206. The abstraction determination module 206 includes computer program instructions for abstracting business logic into centralized database controls. Abstraction determination module 206 may be implemented as one or more sub-modules operating in separate software layers or in the same layer. Although depicted as a separate module from the operating system in FIG. 2, the abstraction determination module 206 or one or more of the sub-modules may be incorporated as part of the operating system 208, part of a database management system, or as part of a software suite.

Figure 3:
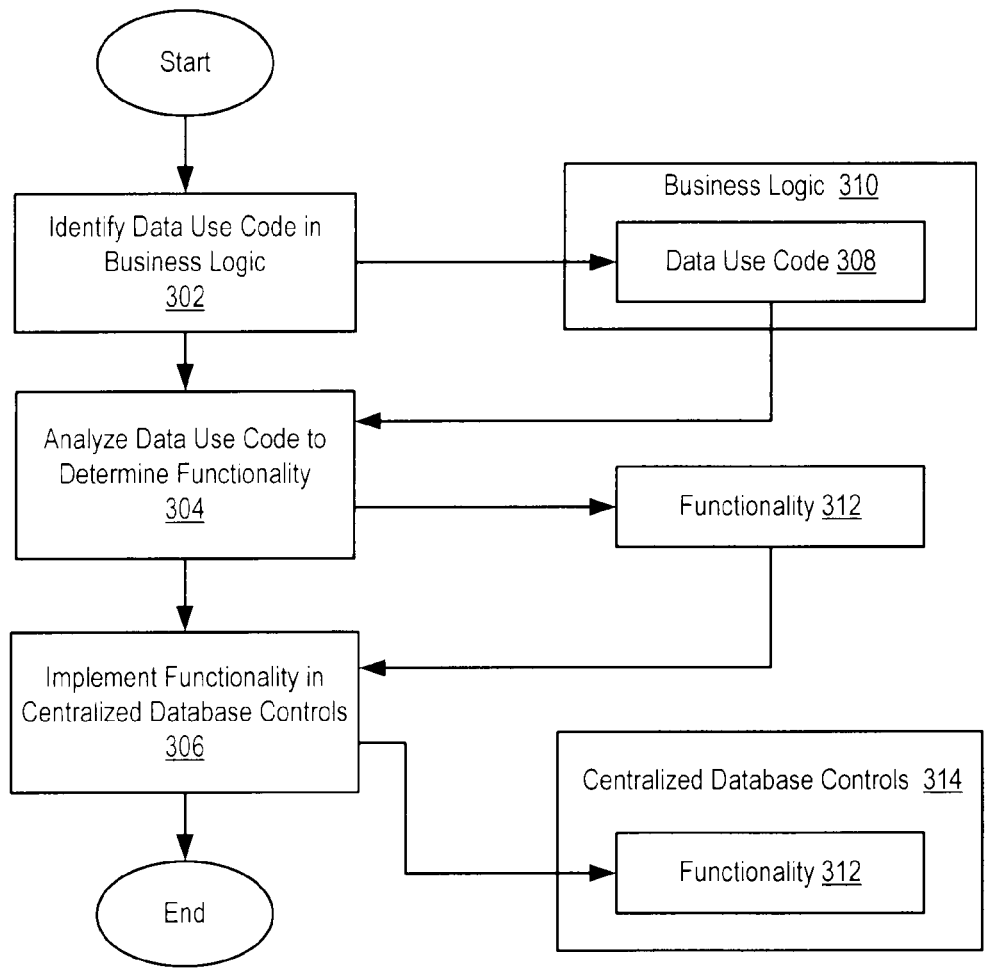
FIG. 3 is a data flow diagram illustrating a computer-implemented method for abstracting business logic into centralized database controls in accordance with one embodiment of the invention.

FIG. 3 is a data flow diagram illustrating one embodiment of a computer-implemented method for abstracting business logic into centralized database controls in accordance with one embodiment of the invention. In FIG. 3, the method includes identifying data use code 308 in business logic 310 (block 302); analyzing the data use code 308 to determine a general data model 312 (block 304); and implementing the general data model 312 in the centralized database controls 314 (block 306). Identifying data use code 308 in business logic 310 (block 302) may be carried out by performing pattern recognition on the business logic 310 to detect known patterns for data use code. Exemplary types of data use code may be constraint checking code, code for implementing a business rule (such as, for example, COBOL loop control structures), or data model information (such as, for example, Data Definition Specifications ('DDS') field edit rules).

Analyzing the data use code 308 to determine a general data model 312 (block 304) may be carried out by analyzing each of the three types of data use code individually in business logic code and user interface code of the software entity. The general data model 312 is an embodiment of the functionality of the data use code 308. Alternatively, the business logic code may be analyzed for code for implementing a business rule and for constraint checking code, and the user interface code, data tables, files, and database coding may be analyzed for constraint checking code and data model information. The abstraction module 206 may first scan the external data definitions, such as those implemented as DDS or SQL, before scanning the source code for internal definitions, such as, for example, I-specs used in the RPG programming language. The abstraction module 206 may also scan data model information in data definitions provided by programs in applicable programming languages (C, RPG, COBOL, etc.).

FIGS. 4A-C are diagrams illustrating the source code of exemplary business logic written in the RPG programming language with embedded data use code which may be abstracted by embodiments of the invention. In FIG. 4A, a DDS defines record layouts of files in IBM i OS by International Business Machines (Armonk. N.Y.). Using these DDSs, the abstraction module 206 may generate SQL Data Definition Language to create corresponding files in an SQL schema within a relational SQL database domain. In FIG. 4B, I-specs (internal description files) are used instead of a DDS to define the data model in the data use code. Abstraction module 206 may also generate SQL Data Definition Language from these I-specs to create corresponding files in an SQL schema. In FIG. 4C, the "CHAIN" command reads the "ORDNAME" file to access the record that matches the "ORDNUM" key value. After external DDS and I-specs are used to create a DDL to create tables in an SQL schema, the abstraction module 206 may scan the business logic for non-SQL file statements, such as the "CHAIN" command described above. The abstraction module 206 may convert this logic to SQL logic, such as:
Select from ORDNAME where ordnumcolumn=ORDDUM where the ordnumcolumn would have been created as a column during SQL DDL creation.

Implementing the general data model 312 in the centralized database controls 314 (block 306) may be carried out by transforming the general data model into mechanisms native to the centralized database controls. Centralized database controls 314 may be implemented in some embodiments as a DBMS (such Oracle, MySQL, or DB2). For example, in a SQL-based DBMS, implementing the general data model 312 in the centralized database controls 314 (block 306) may be carried out by transforming the general data model into mechanisms like triggers and stored procedures and embedding these mechanisms into the relational database definition. Transforming the general data model into native mechanisms (as well as determining the general data model) may be carried out without transforming the general data.

Figure 5A:
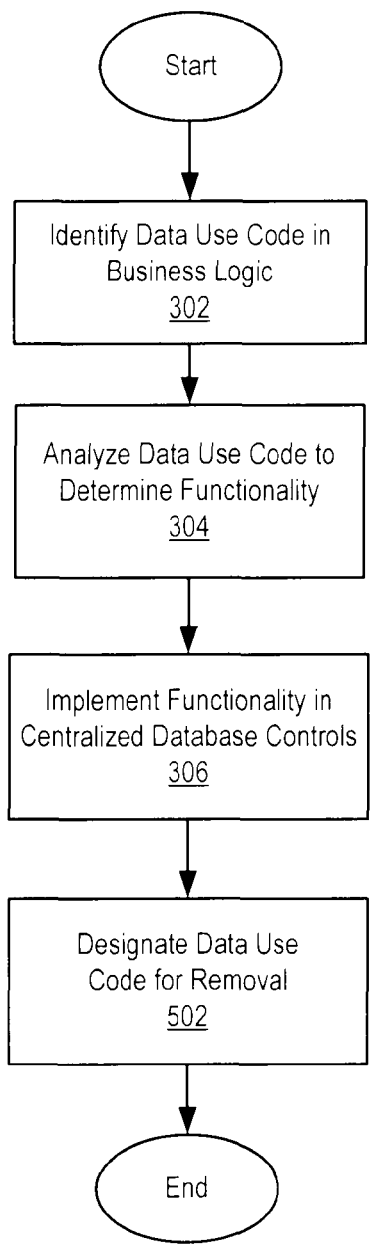
FIGS. 5A and 5B are data flow diagrams illustrating further computer-implemented methods for abstracting business logic into centralized database controls in accordance with embodiments of the invention.
Figure 5B:
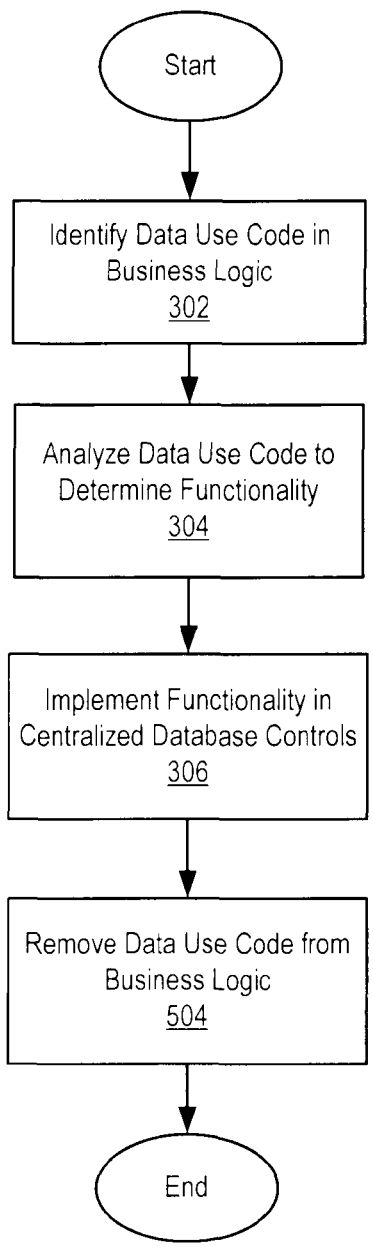

FIGS. 5A and 5B are data How diagrams illustrating further embodiments of a computer-implemented method for abstracting business logic into centralized database controls in accordance with embodiments of the invention. While it is not necessary to remove data use code embedded within the business logic, it may be desirable to decrease overhead and clarify the source code. In FIG. 4A, the abstraction module 206 designates the identified data use code for removal from the business logic (block 502) by flagging, mapping, or otherwise indicating the code in any manner as will occur to those of skill in the art. By designating the identified data use code, the code may be later examined to determine the best methods for removing the code, as well as ensuring the code should actually be removed. In FIG. 4B, the abstraction module 206 removes the data use code from the business logic (block 504). Removing the data use code (block 504) may be carried out using text parsing tools for rule-based source code modification.

Figure 6:
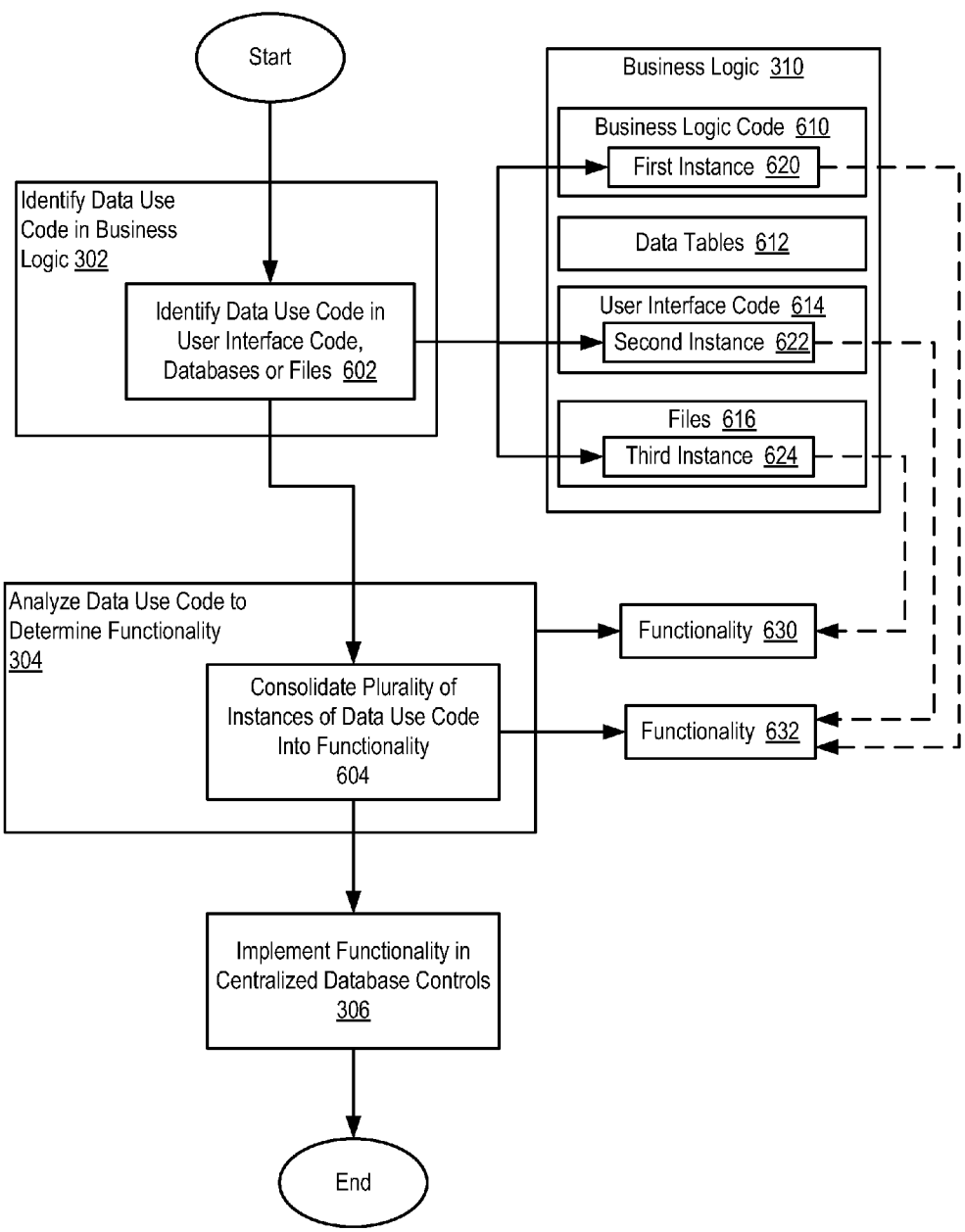
FIG. 6 is a data flow diagram illustrating a computer-implemented method for abstracting data use code in multiple code types into centralized database controls in accordance with one embodiment of the invention.

Embodiments of the present invention may recognize the data model through multiple tiers of code from the software entity for generation to the external relational data store. The coding tiers may include intermingled relationships. FIG. 6 is a data How diagram illustrating a computer-implemented method for abstracting data use code in multiple code types into centralized database controls in accordance with one embodiment of the invention. For example, embodiments of the present invention can recognize and consolidate data model information in an application using a plurality of code types, such as a COBOL program using User Interface Manager ('UIM') as a front end. Data model information may be recognized even though it is implemented across the code types. In FIG. 6, identifying data use code in the business logic (block 302) may include identifying the data use code in one or more subcomponents of the business logic (block 602), such as business logic code 610, a user interface code component 614, a data table 612, a file 616, and a database coding (not shown). Business logic code 610 contains a first instance 620 of data use code. A user interface code component 614 contains a second instance 622 of data use code. Files 616 contain a third instance 624 of data use code.

Still referring to FIG. 6, analyzing the data use code (block 304) may include consolidating a plurality of instances 620, 622, 624 of the data use code into the general data model 630, 632 (block 604). For example, in FIG. 6, the abstraction module 206 consolidates the first instance of the data use code 620 in the business logic code 610 and the second instance of the data use code 622 in the user interface code 614 to determine general data model 630. A third data code instance 624 in files 616 (for example, data model information) is abstracted to general data model 632.

Figure 7:
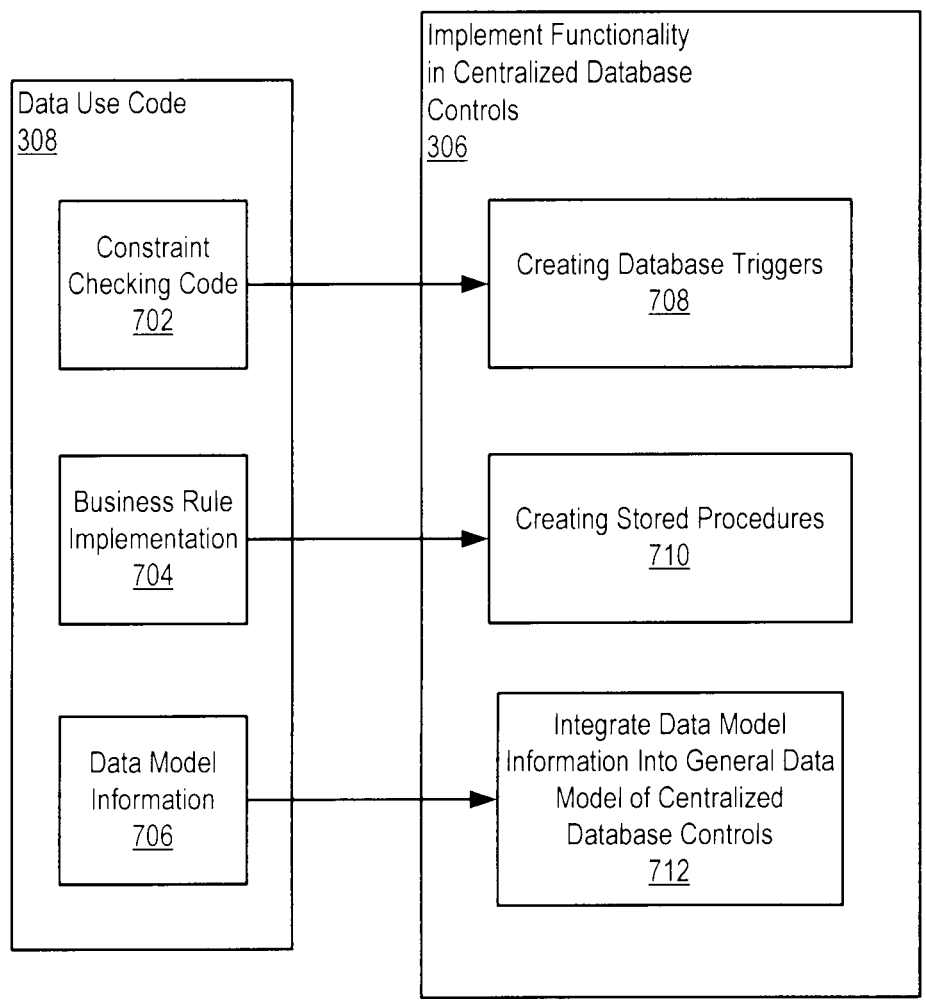
FIG. 7 is a data flow diagram illustrating a computer-implemented method for implementing general data model in the centralized database controls according to the particular characteristics of the data use code in accordance with one embodiment of the invention.

FIG. 7 is a data flow diagram illustrating a computer-implemented method for implementing general data model in the centralized database controls according to the particular characteristics of the data use code in accordance with one embodiment of the invention. As described above, different types of data use code may be embedded in the business logic entity using relational database mechanisms. For data use code 308 comprising constraint checking code 702, implementing the general data model (block 306) may be carried out by creating database triggers (block 708). For data use code 308 comprising a business rule implementation 704, implementing the general data model (block 306) may be carried out by creating stored procedures (block 710). For data use code 308 comprising data model information 706, implementing the general data model (block 306) may be carried out by creating data base artifacts (block 712). For example, data model information contained in code, such as DDS files and C structures, may be conceptualized and converted to DDL to create database artifacts defining the schema of the DBMS.

As discussed with reference to FIG. 3, identifying data use code 308 in business logic 310 (block 302) may be carried out by performing pattern recognition on the business logic 310 and analyzing the patterns of the data use code 308 to determine a general data model 312 (block 304). In operation, the abstraction module 206 may scan source code for particular functions indicating data use code.

In specific embodiments, the abstraction module 206 may scan C (or its variants) for FOPEN or FSCANF functions, and flag these functions. FIGS. 8A and 8B are diagrams illustrating the source code of an exemplary business logic written in C++ with embedded data use code which may be abstracted by embodiments of the invention. The C programming language does not have the capability of non-SQL, non-sequential input/output. Instead, it uses index and data files to work around this problem by streaming file I/O. FSCANF function calls include the format of the data that is being read from the stream I/O file. For example, the parameter "count 1" is a floating point variable. The abstraction module may use this data model information to build the SQL DDL to create a table. If index and data file methodology is identified, then the abstraction module may also generate SQL operations, procedures and triggers.

What is claimed is:

1. A computer-implemented method for abstracting business logic in a legacy application into a relational database, the method comprising:
   identifying the data use code in one or more subcomponents of the business logic comprising business logic code, user interface code, one or more data tables, one or more files, and database coding, the identifying the data use code comprising;
      analyzing the business logic code for implementing a business rule; and
      analysing the user interface code, the one or more data tables, the one or more files, and the database coding for constraint checking code and data model information,
         wherein the business logic code contains a first instance of the data use code,
         wherein the user interface code contains a second instance of the data use code, and
         wherein the one or more files contain a third instance of the data use code;
   consolidating the first instance of the data use code in the business logic code and the second instance of the data use code in the user interface code to generate a first general data model;
   consolidating the third data code instance in the one or more files to generate a second general data model;
   implementing the first and the second general data models, in centralized database controls, comprising:
      creating a stored procedure for the business rule implementation identified in the analyzed data use code;
      creating one or more database triggers for the constraint checking code identified in the analyzed data use code; and
      creating a database artifact for the data model information identified in the analyzed data use code;

2. The computer implemented method according to claim 1, further comprising designating the data use code for removal.

3. The computer implemented method according to claim 2, further comprising removing the data use code in the legacy application.

4. A computer program product disposed on a non-transitory computer-readable medium for abstracting business logic in a legacy application into a relational database, the computer program product comprising:
   computer program instructions for identifying data use code in one or more subcomponents of the business logic comprising business logic code, user interface code, one or more data table, one or more files, and database coding, the computer program instructions for identifying the data use code comprising:
      computer program instructions for analysing the business logic code for implementing a business rule; and
      computer program instructions for analysing the user interface code, the one or more data tables, the one or more files, and the database coding for constraint checking code and data model information,
         wherein the business logic code contains a first instance of the data use code,
         wherein the user interface code contains a second instance of the data use code, and
         wherein the one or more files contain a third instance of the data use code
   computer program instructions for consolidating the first instance of the data use code in the business logic code and the second instance of the data use code in the user interface code to generate a first general data model;
   computer program instructions for consolidating the third data code instance in the one or more files to generate a second general data model;
   computer program instructions for implementing the first and second general data models in centralized database controls, comprising:
      computer program instructions for creating a stored procedure for the business rule implementation identified in the analyzed data use code;
      computer program instructions for creating one or more database triggers for the constraint checking code identified in the analyzed data use code; and
      computer program instructions for creating a database artifact for the data model information identified in the analyzed data use code.

5. The computer program product according to claim 4, further comprising computer program instructions for designating the data use code for removal.

6. The computer program product according to claim 5, further comprising computer program instructions for removing the data use code in the legacy application.

7. A system for abstracting business logic into a relational database, the system comprising:
   a processor; and
   a computer memory operatively coupled to the processor, the computer memory having disposed within it:
      computer program instructions for identifying data use code in one or more subcomponents of the business logic comprising business logic code, user interface code, one or more data tables, one or more files, and database coding, the computer program instructions for identifying the data use code comprising:
         computer program instructions for analyzing the business logic code for implementing a business rule; and
         computer program instructions for analyzing the user interface code, the one or more data tables, the one or more files, and the database coding for constraint checking code and data model information,
            wherein the business logic code contains a first instance of the data use code,
            wherein the user interface code contains a second instance of the data use code, and
            wherein the one or more files contain a third instance of the data use code
      computer program instructions for consolidating the first instance of the data use code in the business logic code and the second instance of the data use code in the user interface code to generate a first general data model;
      computer program instructions for consolidating the third data code instance in the one or more files to generate a second general data model;
      computer program instructions for implementing the first and second general data model in centralized database controls, comprising:
         computer program instructions for creating a stored procedure for the business rule implementation identified in the analyzed data use code;

computer program instructions for creating one or more database triggers for the constraint checking code identified in the analysed data use code; and computer program instructions for creating a database artifact for the data model information identified in the analyzed data use code.

8. The system according to claim 7, further comprising computer program instructions for designating the data use code for removal.

9. The system according to claim 8, further comprising computer program instructions for removing the data use code in the legacy application.

* * * * *